United States Patent [19]

Linlor

[11] Patent Number: 4,542,963

[45] Date of Patent: Sep. 24, 1985

[54] OPTICAL SYSTEM WITH REFLECTIVE BAFFLES

[75] Inventor: William I. Linlor, Mountain View, Calif.

[73] Assignee: The United States of America as represented by the United States National Aeronautics and Space Administration, Washington, D.C.

[21] Appl. No.: 594,134

[22] Filed: Mar. 28, 1984

[51] Int. Cl.⁴ ............................................. G02B 23/00
[52] U.S. Cl. ................................. 350/537; 350/276 R; 350/319; 350/448; 350/580
[58] Field of Search .................. 350/580, 276 SL, 319, 350/448, 276 R, 537, 610

[56] References Cited

U.S. PATENT DOCUMENTS 2,670,656  3/1954  Braymer ............................... 350/439
3,699,471 10/1972  Mulready et al. ............. 350/276 SL

FOREIGN PATENT DOCUMENTS 2477288  4/1981  France .
1596766  8/1981  United Kingdom .

OTHER PUBLICATIONS

"Applied Optics", vol. 13, No. 3, Mar. 74.
"Design Features of a Space Telescope", SPIE, vol. 97, High Speed Photography, (Toronto 1976).

Primary Examiner—John K. Corbin
Assistant Examiner—R. Eyssallenne
Attorney, Agent, or Firm—Darrell G. Brekke; John R. Manning; Robert D. Marchant

[57] ABSTRACT

Baffles (34) in infrared telescope (10) extend circumferentially around tube (12) of the telescope. Each of the baffles (34) has a concave, rearwardly facing curved surface (36) and a frontwardly facing planar surface (38). Baffles (34) extend from the interior wall of tube (12) in an acute angle with the optical axis (20) of the telescope, relative to front end (14) of the tube (12). This acute angle becomes greater for the baffles (34) toward rear end (16) of the telescope (10). Incoming off axis rays (44) are reflected by the planar surface (38) of the baffles (34) against the curved surface (36) of a forward adjacent baffle (34) and are reflected back and forth between adjacent surfaces (38) and (36) a number of times before being reflected back as rays (46) out of the front end of the telescope (10). Other off axis rays (40) are directly reflected as rays (42) by the planar surfaces (38) of the baffles (34).

10 Claims, 5 Drawing Figures

FIG. I

OPTICAL SYSTEM WITH REFLECTIVE BAFFLES

ORIGIN OF THE INVENTION

The invention described herein was made by an employee of the U.S. Government and may be manufactured and used by or for the Government for governmental purposes without the payment of any royalties thereon or therefor.

TECHNICAL FIELD OF THE INVENTION

This invention relates to an optical system incorporating a plurality of reflective baffles which return incoming off axis rays from the optical system. More particularly, it relates to such an optical system incorporating reflective baffles which prevents off axis rays in infrared wavelength regions from reaching a focal plane of the optical system, without absorbing such infrared rays to a significant extent. More particularly, it relates to such an optical system especially adapted to receive infrared images and which is cooled with liquid helium or other suitable cooling means.

BACKGROUND ART

Telescopes are often used to concentrate light on detectors, such as photometers, spectrometers, bolometers, and the like. Incoming light in a direction that is not parallel to the axis of the telescope can degrade the quality of the desired image, if such off axis light is not suitably intercepted.

It is common practice to provide baffles for telescopes operating in the visible light wavelength region, which baffles are coated with "optical blacks". Off axis rays striking these surfaces are essentially absorbed; only a very small fraction is scattered. For such telescopes, the state of the art is highly developed and the literature is extensive.

More recently, there has been an increasing interest in telescopes for placement in earth orbit intended to operate in the infrared region, e.g., ranging in wavelength from 1 to 1,000 microns, i.e., $10^{-6}$ to $10^{-3}$ meters. For such telescopes, optical blacks may fail to absorb incident radiation adequately. Additionally, such coatings can become detached from the baffles, causing contamination of the telescope. The delicate nature of the optical black surfaces also makes refurbishment difficult.

With respect to optical systems that are cooled, such as by liquid helium or other coolant, for increasing imaging resolution of the optical system, absorption of radiation at infrared wavelengths constitutes a major heat load for the cooling system, requiring large, massive helium tanks for adequate cooling.

For these and similar reasons, attention has been directed recently to the use of reflective baffles in optical systems. For example, Davis, U.S. Pat. No. 3,488,103, issued Jan. 6, 1970 discloses a reflecting baffle having a concave, elliptical surface facing the direction off axis rays enter an optical system. However, in order for the system there disclosed to exclude off axis radiation sufficiently, the field of view of the optical system must be substantially reduced. Radovich, U.S. Pat. No. 4,217,026, issued Aug. 12, 1980, discloses an optical system incorporating a plurality of baffles that are each also concave with respect to the incident radiation to be reflected. This system also results in substantial reduction of the field of view, and it is only partially effective for rejecting skew off axis rays. As a result, approximately 10% of the incident off axis radiation is not reflected back out of the system. A similar system is described by Rock et al, "Use of Reflective Baffles for Control of Aperture Heat Loads and Stray Radiation," Optical Systems Engineering, Proceedings of SPIE, Vol. 330, pp. 60-65, January 1982, in which radiation absorbing surfaces are placed in the vicinity of the first baffle, in order to prevent skew rays from reaching the image plane. Such a system is also disclosed by Bremer, "Baffle Design for Earth Radiation Rejection in the Cryogenic Limb Scanning Interferometer/Radiometer", Optical Engineering, Vol. 22, No. 1, pp. 166-171, January-February 1983.

A variety of other approaches are also shown in the following patents for preventing off axis rays from degrading an image produced by an optical system: Taylor, U.S. Pat. No. 2,738,700, issued Mar. 20, 1956; Nicoll, U.S. Pat. No. 2,821,109, issued Jan. 28, 1958; Lawrence, U.S. Pat. No. 3,016,798, issued Jan. 16, 1962; Buttweiler, U.S. Pat. No. 3,648,056, issued Mar. 7, 1972; Vulmiere et al, U.S. Pat. No. 3,675,984, issued July 11, 1972; McCracken, U.S. Pat. No. 3,905,675, issued Sept. 17, 1975. While the art relating both to absorption and reflection of off axis rays to prevent image degradation in optical systems is therefore a well developed one, a need still remains for further development of such systems, in order to meet the stringent demands of infrared telescopes and similar optical systems.

STATEMENT OF INVENTION

Accordingly, it is an object of this invention to provide an optical system incorporating reflecting baffles for off axis rays which is capable of preventing such off axis rays from reaching a focal plane of the system, without requiring significant absorption of such radiation in the system.

It is another object of the invention to provide such a system in which the reflecting baffles reduce the field of vision less than prior art reflecting baffles.

It is a further object of the invention to provide such an optical system in which the reflecting baffles are effective for reflecting both meridional and skew off axis rays from the system.

It is still another object of the invention to provide an infrared telescope in which off axis rays are prevented from reaching the focal plane of the telescope without materially increasing cooling system demands in the telescope.

The attainment of these and related objects may be achieved through use of the novel reflecting baffle optical system herein disclosed. An optical system in accordance with this invention has a tube with a front end and a back end. Image optics are mounted in the tube with an optical axis extending lengthwise of the tube. There are a plurality of electromagnetic radiation reflecting baffles extending around a bore of the tube. The optical axis is free of obstruction from the baffles. At least a first one of the baffles defines a concaved curved surface facing toward the back end of the tube. At least a second one of the baffles defines a substantially planar surface facing the concave curved surface. The concave surface of the first baffle and the substantially planar surface of the second baffle coact to reflect off axis electromagnetic radiation entering the optical system from the front end of the tube.

By providing reflecting baffles having the above described configuration, both meridional and skew off axis rays entering the tube are reflected back out the front end of the tube. As a result, no off axis rays are allowed to reach the focal plane of the optical system, and substantial absorption of such off axis rays within the optical system does not occur. As a result, an optical system which is cooled with a cryogenic liquid or other suitable coolant does not require an increase in cooling capacity in order to compensate for the heat that would be produced if off axis rays were absorbed.

The attainment of the foregoing and related objects, advantages and features of the invention should be more readily apparent to those skilled in the art, after review of the following more detailed description of the invention, taken together with the drawings in which:

DETAILED DESCRIPTION OF THE INVENTION

Figure 1:
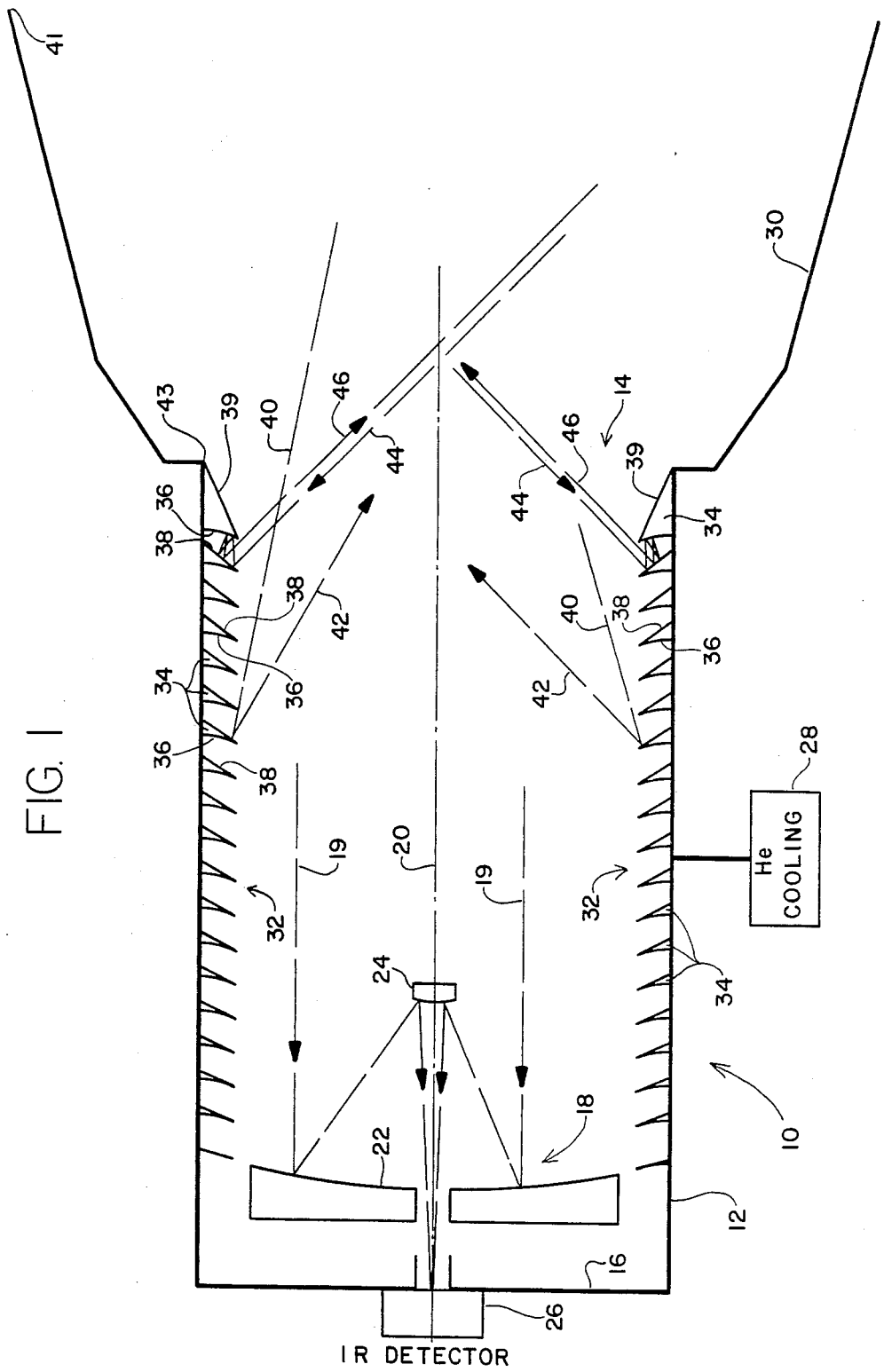
FIG. 1 is a cross section view of an optical system in accordance with the invention.

Turning now to the drawings, more particularly to FIGS. 1-4, there is shown an infrared telescope 10 in accordance with the invention. The telescope 10 has a tube 12 with a front end 14 and a back end 16, the back end being coincident with the focal plane of optics 18. Light rays 19 parallel to the optical axis 20 of the telescope are reflected by primary mirror 22 and secondary mirror 24 to define an image at the focal plane. An infrared detector 26 is positioned to record the image at the focal plane. In order to make the telescope 10 as sensitive as possible, a liquid helium refrigeration system 28 is connected to cool the tube 12. This is done in order to prevent stray infrared emissions from the interior wall of the tube 12. As a result, the infrared detector 26 will record very faint infrared rays parallel to the optical axis 20, without also recording stray radiation from the telescope wall 12.

In order to reduce entrance of off axis light rays from strong sources, such as the sun, moon, planets and nearby stars, a sun shield 30 of generally frustoconical shape is mounted on the front end of the cylindrical telescope tube 12. In practice, however, some off axis rays do enter the front 14 of tube 12 if their sources are within the field of vision of the tube 12 and shield 30 combination. Also, when the sun strikes the outside surface of the shield 30, the shield absorbs heat, which it re-emits as off axis infrared radiation, some of which may also enter the front end 14 of tube 12. A set 32 of baffles 34 in accordance with this invention is provided to reflect such off axis rays back out of the front 14 of tube 12, without substantially interfering with the field of view of the telescope 10, so that such off axis rays are prevented from reaching the infrared detector 26. It should be noted that the telescope as shown in FIG. 1 is symmetrical about the optical axis 20.

Figure 2:
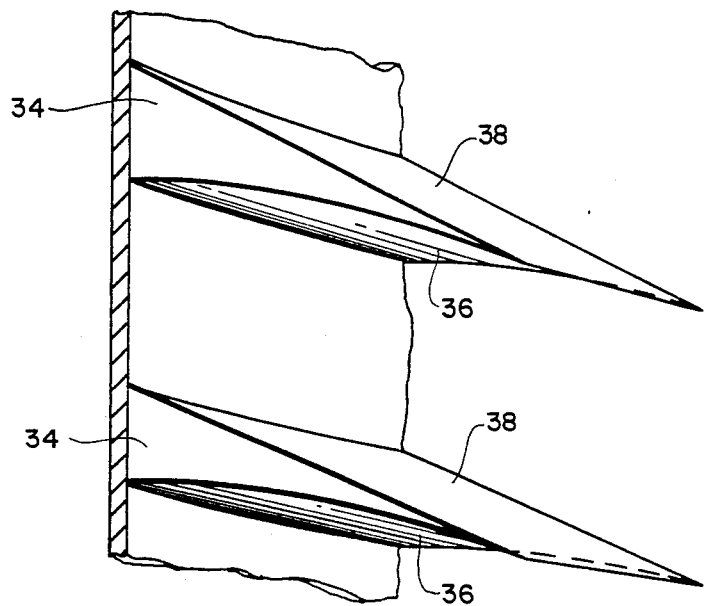
FIG. 2 is a perspective view of a portion of the optical system shown in FIG. 1.
Figures 3, 4:
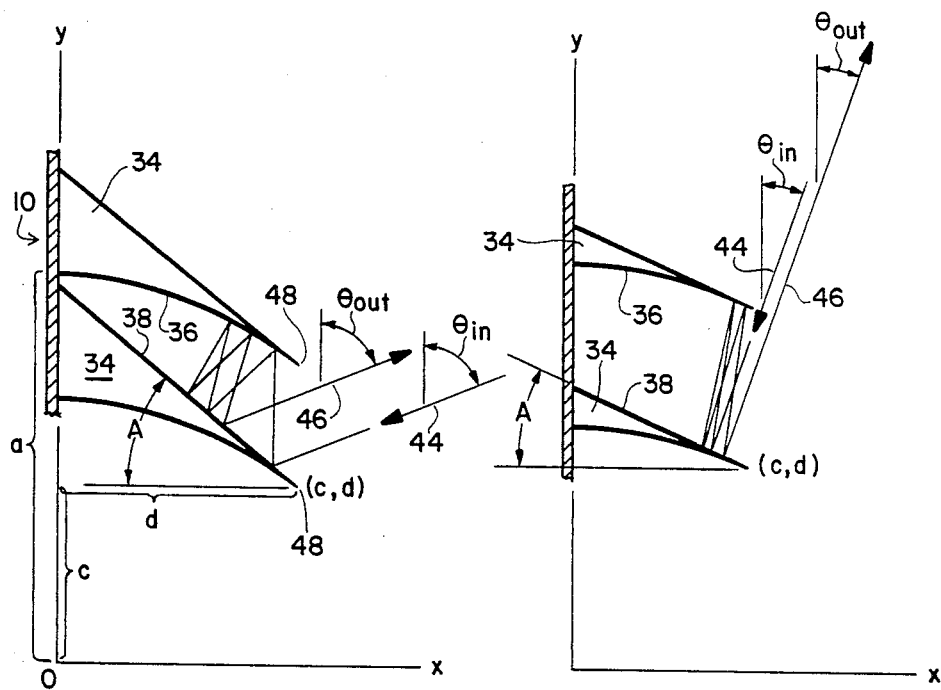
FIG. 3 is an enlarged view of a portion of the optical instrument shown in FIG. 1, in order to show detail.
FIG. 4 is an enlarged view of a similar portion of the optical instrument shown in FIG. 1.

As shown in FIGS. 1-4, each of the individual baffles 34 in the set 32 has a concave, rearwardly facing curved surface 36 and a frontwardly facing, substantially planar surface 38. The surfaces 36 and 38 both extend from the interior wall of tube 12 and intersect to define each baffle 34. In FIGS. 3-4, the surfaces 36 are shown as sectors of circles having a radius of curvature originating at the interior wall of tube 12. However, essentially any shape, including an elliptical curve, could be used for the surface 36 as long as it will coact with the planar surface 38 to reflect off axis rays 40 and 44 out of the tube 12. The baffles 34 form an acute angle with the optical axis 20 of the telescope, relative to the front end 14 of tube 12. This acute angle becomes greater for the baffles 34 moving toward the rear end 16 of the telescope 10. This angle is established for each baffle 34 to assure that all off axis rays are reflected from the front end 14 of the telescope 10. Because the telescope 10 is symmetrical about the optical axis 20, surface 36 is in the form of a torus, a portion of which is shown in FIG. 2, and surface 38 is in the form of a cone.

In practice, the baffles 34 function in the following manner to reflect off axis rays out front end 14 of the telescope 10. Some of the off axis rays 40, i.e., meridional rays, enter the tube 12 at an angle relatively close to the optical axis 20 of the telescope. These meridional off axis rays 40 are directly reflected as rays 42 by the planar surfaces 38 of the baffles 34. However, other incoming off axis rays 44 are reflected back as rays 46 in an entirely different manner. The rays 44 are reflected by the planar surface 38 of the baffles 34 against the curved surface 36 of a forward adjacent baffle 34 as shown in FIGS. 1 and 3-4. The rays 44 are reflected back and forth between the adjacent surfaces 38 and 36 a number of times. Because of the geometries and positioning of the facing surfaces 38 and 36, the rays 44 move as they are reflected toward the inner wall of the tube 12, then move away from the inner wall of tube 12, until they clear end 48 of the leading baffle 34. These two modes of reflection make the baffles 34 effective for reflecting both meridional and skew off axis rays out of the front end 14 of the telescope. Even with a substantial number of reflections between facing surfaces 36 and 38 of adjacent baffles 34, only a very small percentage, significantly less than 10% in practice, of the infrared energy of the reflected beams 46 is absorbed by the baffles 34. As a result, the infrared energy is prevented from reaching the infrared detector 26, without requiring a substantial increase in the capacity of the helium refrigeration unit 28. An extended leading surface 39 on the first baffle 34 of the set 32 is parallel to a line drawn from lip 41 of the sun shield 30 to edge 43 of front end 14 of tube 12. Off axis rays within the area encompassed by the edge 41 of the shield are directly reflected away from the tube 12 and shield 30 by this surface 39.

Further details on the reflection of incoming off axis rays 44 by the baffles 34 near the front end 14 of the telescope 10 are shown in FIG. 3. Certain geometrical relationships of the surfaces 36 and 38 are also shown in FIG. 3. These relationships are used to calculate the angle of baffles 34 and their dimensions in order to reflect all of the incoming off axis rays 40 and 44 from the tube 12. All distances given in the course of this explanation are expressed in centimetres, and all angles are expressed in degrees. The distance a represents the radius of curvature of surface 38, in this case, representing a sector of a circle, with the origin of the circle at the interior wall of the telescope 10. The distance d represents the horizontal displacement of a baffle tip 48 from the interior wall of tube 12, and the distance c represents the vertical displacement of tip 48 from the origin of radius a. Angle A is the angle of inclination of substantially planar surface 36 with respect to the horizontal. Angle $\theta_{in}$ represents the angle of an incoming off axis ray 44 relative to the optical axis 20 of the telescope. The angle $\theta_{out}$ is the angle an outgoing off axis ray 46 forms relative to the optical axis 20.

In the following discussion, specific values are given for the above parameters, assuming that the baffles 34 are installed in a telescope having a tube 12 with a radius of 50 cm. The baffles 34 shown in FIG. 3 are installed near entrance end 14 of the telescope. The above parameters have the values shown below in Table I.

TABLE I

A = 38.81°
$\theta_{in}$ = 67.88°
$\theta_{out}$ = 68.15°
a = 19.40 cm
c = 12.16 cm
d = 8.90 cm As can be seen from FIG. 3, outgoing off axis ray 46 leaves surface 38 at a point above the initial impact of incoming off axis ray 44 on the surface 36.

FIG. 4 shows baffles 34 positioned near the optics 18 within the telescope 10 (FIG. 1). As shown in Table II, surface 36 has the same radius of curvature as the surface 36 in FIG. 3. However, the angle A is considerably smaller

TABLE II

A = 23.47°
$\theta_{in}$ = 25.32°
$\theta_{out}$ = 25.78°
a = 19.40 cm
c = 7.73 cm
d = 9.90 cm As shown, the angle $\theta_{in}$ the incoming off axis beam 44 and the angle $\theta_{out}$ of the outgoing off axis beam 46 are also smaller than in FIG. 3. The point of impact of incoming off axis ray 44 is above the point of reflection of outgoing off axis beam 46 on surface 38.

Figure 5:
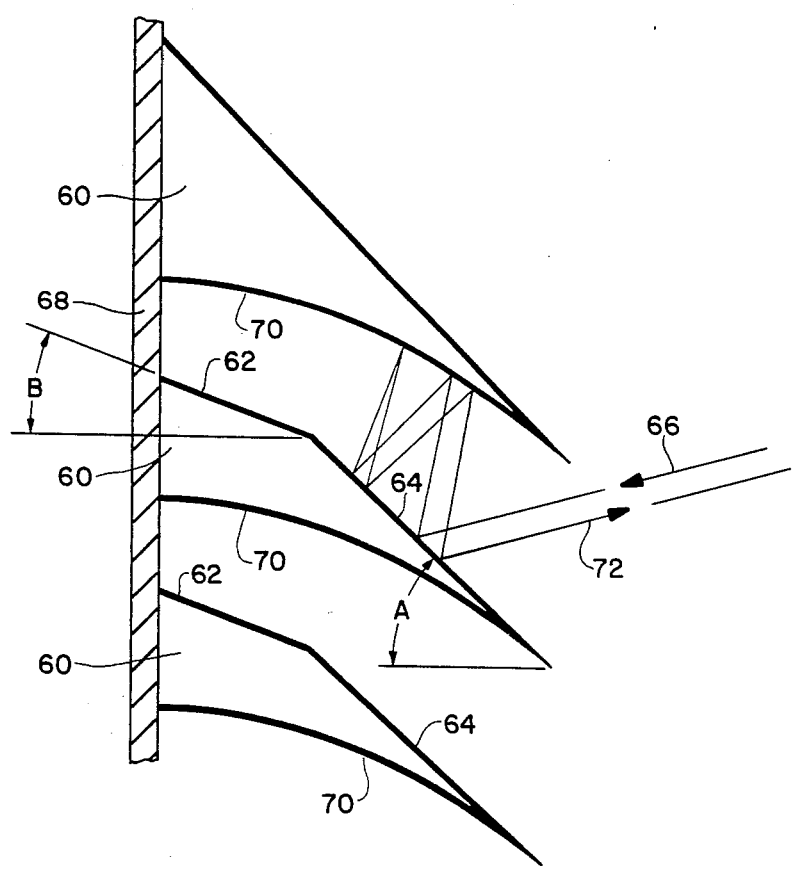
FIG. 5 is a cross section view of a portion of another embodiment of the invention.

FIG. 5 shows another embodiment of the invention, in which baffles 60 have two separate forward facing planar surfaces 62 and 64. Such an arrangement is necessary in some cases to assure that incoming off axis rays 66 do not reach the interior surface of tube 68 in their reflections between surfaces 62 and 64 on the one hand and curved, rearward facing surface 70 of an adjacent baffle 60 before the final reflection as an outgoing off axis ray 72. In a representative example, where the radius of curvature of surface 70 is 19.40 cm, the angle A of surface 64 is 42.9° and angle B, which represents the inclination of surface 62 relative to the horizontal, is equal to 20.0°.

In a specific embodiment a set of nine baffles in a telescope has the parameters shown in Table III below. FIG. 3 and its corresponding text defines the variables.

TABLE III

| Baffle System Parameters | | | | | | |
|---|---|---|---|---|---|---|
| Baffle | A, deg | c, cm | d, cm | $\theta_{in}$, deg | $\theta_{out}$, deg | $\theta_{in} - \theta_{out}$, deg |
| 1 | 23.47 | 7.73 | 9.90 | 25.32 | 25.78 | −0.46 |
| 2 | 29.50 | 9.70 | 11.25 | 43.00 | 43.01 | −0.01 |
| 3 | 30.67 | 9.90 | 11.08 | 40.00 | 39.98 | 0.02 |
| 4 | 32.26 | 10.36 | 10.80 | 45.00 | 45.01 | −0.01 |
| 5 | 33.77 | 10.78 | 10.00 | 50.89 | 50.84 | 0.05 |
| 6 | 38.81 | 12.16 | 8.90 | 67.88 | 68.15 | −0.27 |
| 7 | 44.53 | 13.61 | 7.40 | 50.00 | 49.92 | 0.08 |
| 8 | 44.53 | 13.61 | 7.40 | 60.00 | 60.27 | −0.27 |
| 9 | 44.53 | 13.61 | 7.40 | 87.67 | 87.80 | −0.13 |

Depending on the geometry of a particular telescope, suitable values for the parameters discussed above can be calculated for a set of baffles in accordance with the invention which will prevent all meridional and skew off axis rays entering the telescope from reaching the focal plane of the telescope, through use of the reflection modes discussed above. In a telescope operating in the infrared region with wavelengths from 1 to 1,000 microns, i.e., $10^{-6}$ to $10^3$ meters, only a very small amount of off axis infrared energy is absorbed by the baffle surfaces, with almost total reflection out of the telescope. The primary source of the off axis rays reflected by the telescope of this invention comes from the sun shield 30. The heat load on the baffles produced by thermal radiation can be approximated by assuming that each ray makes a total of six reflections between the baffle surfaces and then is returned back out of the telescope. For a sun shield 30 temperature of 200° K., the peak of the Planck radiation distribution occurs at about 15 microns. At this wavelength and a temperature of the baffles 34 of 10° K. as a result of helium cooling, a gold plated reflector has a theoretical absorbtivity of $10^{-3}$, based on data from the International Critical Tables. For the corresponding reflectivity of 0.999 and six reflections, the net reflectivity is equal to 0.99. Allowing for surface contamination and similar effects, which may reduce the reflectivity by unknown amounts, a conservative conclusion is that the net reflectivity may be reduced to 0.90, for which the heat load on the baffles is approximately 10% of the amount if all the rays incident on the baffles were absorbed.

It should now be readily apparent to those skilled in the art that an optical system with reflective baffles capable of achieving the stated objects of the invention has been provided. The baffles of the optical system of this invention prevent off axis rays from reaching the focal plane of the system, without requiring significant absorption of such radiation in the system. The invention is effective for reflecting both meridional and skew off axis rays, without intruding significantly on the field of vision of an optical system incorporating the baffles.

It should further be apparent to those skilled in the art that various changes in form and details of the invention as shown and described may be made. It is intended that such changes be included within the spirit and scope of the claims appended hereto.

What is claimed is:

1. An optical system which comprises a tube having an open front end and a back end, image optics mounted in said tube with an optical axis extending lengthwise of said tube, a plurality of electromagnetic radiation reflecting baffles extending around a bore of said tube, said optical axis being free of obstruction from said baffles, at least a first one of said baffles defining a concave curved surface facing toward the back end of said tube, at least a second one of said baffles defining a substantially planar surface facing said concave curved surface, the concave surface of said first baffle and the substantially planar surface of said second baffle coacting to reflect off axis electromagnetic radiation entering said optical system from the front end of said tube so that the reflected radiation leaves the open front end of said tube.

2. The optical system of claim 1 in which said baffles are disposed at an acute angle relative to said optical axis, and extend toward the rear of said tube.

3. The optical system of claim 2 in which there are a plurality of sets of said first and second baffles.

4. The optical system of claim 3 in which the acute angle of the baffle sets relative to the optical axis increases in a direction toward the rear end of said tube.

5. The optical system of claim 1 additionally comprising a cooling means coupled to said tube.

6. The optical system of claim 5 in which said cooling means comprises liquid helium refrigeration.

7. The optical system of claim 5 additionally comprising a detection means for infrared electromagnetic radiation positioned to receive infrared electromagnetic radiation from said image optics.

8. The optical system of claim 1 additionally comprising a shield for off axis light rays extending from the front end of said tube.

9. The optical system of claim 8 in which a leading baffle of said plurality of baffles has a substantially planar surface parallel to a line extending from an edge of said shield to an edge of the front end of said tube.

10. The optical system of claim 1 in which said concave curved surface is defined by a sector of a circle having its radius of curvature at a wall defining said tube.

* * * * *